(12) United States Patent
Basra et al.

(10) Patent No.: US 6,716,515 B2
(45) Date of Patent: Apr. 6, 2004

(54) CASTELLATION TECHNIQUE FOR IMPROVED LIFT-OFF OF PHOTORESIST IN THIN-FILM DEVICE PROCESSING AND A THIN-FILM DEVICE MADE THEREBY

(75) Inventors: Vijay K. Basra, Reading, MA (US); Lawrence G. Neumann, Lancaster, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/346,326

(22) Filed: Jan. 16, 2003

(65) Prior Publication Data

US 2003/0099814 A1 May 29, 2003

Related U.S. Application Data

(62) Division of application No. 09/429,379, filed on Oct. 28, 1999, now Pat. No. 6,524,689.

(51) Int. Cl.[7] .................................................. C03F 7/00
(52) U.S. Cl. ................... 428/195.1; 428/220; 428/332; 430/313; 430/314; 430/323; 430/324; 430/496
(58) Field of Search ............................. 428/195.1, 336, 428/220; 430/11, 312, 314, 5, 496, 313, 323, 324

(56) References Cited

U.S. PATENT DOCUMENTS

| 4,256,816 | A | | 3/1981 | Dunkleberger ................ 430/11 |
| 4,349,621 | A | | 9/1982 | Cline .......................... 430/311 |
| 4,493,855 | A | | 1/1985 | Sachdev et al. ............. 430/670 |
| 4,698,285 | A | | 10/1987 | Ehrfeld et al. .................. 430/5 |
| 5,087,535 | A | | 2/1992 | Hirokane et al. ............... 430/5 |
| 5,403,680 | A | * | 4/1995 | Otagawa et al. ............ 429/213 |
| 5,635,335 | A | | 6/1997 | Bae et al. ................... 430/312 |
| 5,658,469 | A | | 8/1997 | Jennison ..................... 428/611 |
| 5,673,474 | A | * | 10/1997 | Watterston et al. ...... 29/603.14 |
| 5,850,324 | A | | 12/1998 | Wu et al. .................... 360/322 |
| 5,909,346 | A | * | 6/1999 | Malhotra et al. ........... 360/126 |
| 6,130,805 | A | | 10/2000 | Sasaki et al. ............... 360/126 |
| 6,154,346 | A | | 11/2000 | Sasaki ........................ 360/317 |
| 6,353,511 | B1 | * | 3/2002 | Shi et al. .................... 360/126 |

* cited by examiner

*Primary Examiner*—Stephen Stein
(74) *Attorney, Agent, or Firm*—Morrison & Foerster LLP

(57) ABSTRACT

A castellation technique for improved lift-off of deposited thin film on photoresist in thin-film device processing of particular utility in the production of magnetic data transducers and recording heads. By correctly designing the edge boundary of a photoresist structure, enhanced regions of low resist edge bombardment and low deposit penetration may be achieved. These enhanced regions enable the lift-off of extra thick deposited regions that would not be otherwise achievable through the use of conventional techniques with and without castellation.

24 Claims, 3 Drawing Sheets

US 6,716,515 B2

CASTELLATION TECHNIQUE FOR IMPROVED LIFT-OFF OF PHOTORESIST IN THIN-FILM DEVICE PROCESSING AND A THIN-FILM DEVICE MADE THEREBY

CROSS REFERENCE TO RELATED APPLICATIONS

This application is a divisional application to U.S. patent application Ser. No. 09/429,379, now U.S. Pat. No. 6,524, 689 B1, filed Oct. 28, 1999, which claims priority to and the benefit of the filing date thereof.

BACKGROUND OF THE INVENTION

The present invention relates, in general, to the field of thin-film devices and techniques for manufacturing the same. More particularly, the present invention relates to a castellation technique for improved lift-off of photoresist in thin-film device processing of particular utility in the production of magnetic data transducers and recording heads.

Current thin-film disk and tape head structures require the formation of insulation layers to improve the electrical isolation between various conductive layers in the structure. A particular head and conductor isolation structure is disclosed in U.S. Pat. No. 5,850,324 issued Dec. 15, 1998 for; "Magnetoresistive Head Having Electrically Isolated Conductor Leads". Patterning of the insulating layers is achieved by what is commonly known as the "lift-off" process. A particular photoresist lift-off technique and a discussion of other prior art techniques is disclosed in U.S. Pat. No. 5,658,469 issued Aug. 19, 1997 for: "Method for Forming a Re-Entrant Photoresist Lift-Off Profile for Thin Film Device Processing and a Thin Film Device Made Thereby". The disclosures of the aforementioned patents are herein specifically incorporated by this reference.

Conventional lift-off structures have been, by their very nature, primarily limited to the lift-off of relatively thin films only. However, and particularly with respect to magnetic tape heads having thicker permanent magnet ("PM") stack designs, increased thickness insulation layers are required to cover the increased residual re-deposition of materials produced by increased ion-milling operations as well as to provide planarization of the resultant structures to depths of up to three to five times that encountered in conventional disk drive heads.

Further, as tape heads move towards an ever increasing number of channels on a single head, extra thick insulating films are needed for acceptable electrical yield of each of the channels in order to ensure high yields for the head as a whole.

SUMMARY OF THE INVENTION

Disclosed herein is a castellation technique for improved lift-off of deposited thin films on photoresist in thin-film device processing of particular utility in the production of magnetic data transducers and recording heads. By correctly designing the edge boundary of a photoresist structure, enhanced regions of low resist edge bombardment and low deposit penetration may be achieved. These enhanced regions enable the lift-off of extra thick insulation regions that would not be otherwise achievable through the use of conventional techniques with and without castellation.

Specifically disclosed is an improved method for lifting off extra thick insulation layers with patterned photoresist through the optimization of the photoresist edge design in order to achieve improved electrical isolation characteristics.

Particularly disclosed herein is a thin-film device produced by a process comprising the steps of patterning a photoresist layer overlying a thin-film device structure formed on a substrate. The photoresist layer includes a plurality of peripherally extending tabs having interstitial spaces therebetween with at least one of the plurality of tabs having a lateral width greater than a corresponding lateral width of adjacent ones of the interstitial spaces with the width of the interstitial spaces being substantially on the order of the photoresist thickness. The photoresist layer and the substrate are overlaid with a deposited layer and the photoresist layer and the deposited layer overlying the photoresist layer are thereafter removed to expose the thin-film device structure.

Still further disclosed herein is a photoresist lift-off structure for forming a thin-film device. The structure comprises a photoresist layer overlying a thin-film device structure formed on a substrate. The photoresist layer includes a plurality of peripherally extending tabs having interstitial spaces therebetween with at least one of the plurality of tabs having a lateral width greater than a corresponding lateral width of adjacent ones of the interstitial spaces.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1A:
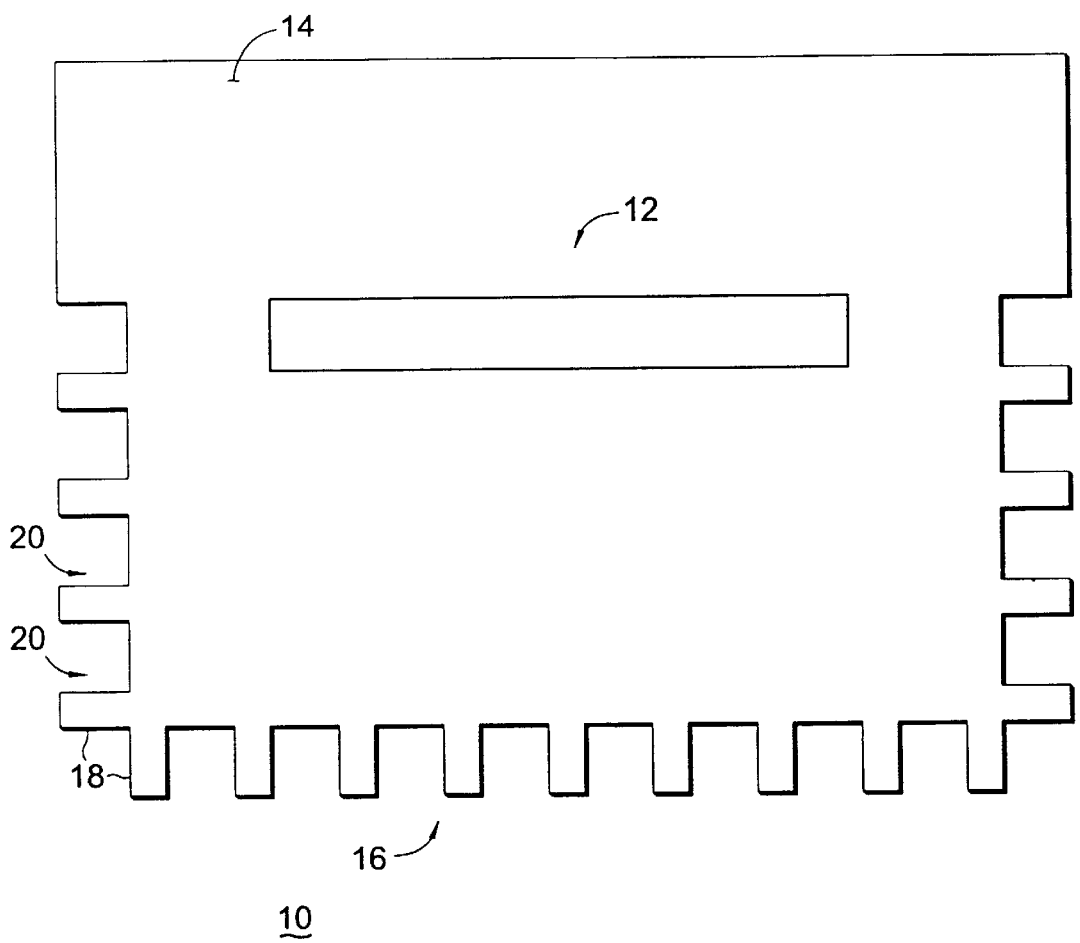
FIG. 1A illustrates a top plan view of a representative thin-film device structure (e.g. a tape head) over which has been deposited a layer of photoresist having a wide cut castellated boundary characterized by a number of peripherally extending protrusions of on the order of 3.0 $\mu$m in width and interstitial cuts of on the order of 6.0 $\mu$m in depth and 7.0 $\mu$m in width.

With reference now to FIG. 1A, a typical representative thin-film device structure 10 is shown. The device structure 10 comprises, in the example illustrated, a data transducer structure 12 over which has been patterned a relatively thick layer of photoresist 14. The photoresist 14 presents a peripheral edge portion 16 which has been patterned with a plurality of tabs 18 extending outwardly therefrom. The tabs 18 are separated by interstitial cuts (or spaces) 20 as shown.

Figure 1B:
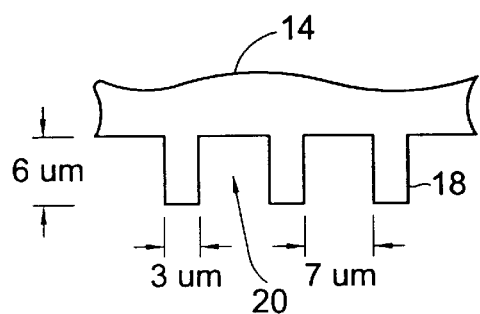
FIG. 1B is a more detailed top plan view of a portion of the wide cut castellated boundary of FIG. 1A.

With reference additionally now to FIG. 1B, the details of the tabs 18 and cuts 20 in the wide cut photoresist 14 of the device structure 10 is shown. In this representative embodiment, the tabs have a lateral width of substantially 3.0 µm and are approximately 6.0 µm in length from their proximal to distal ends thereof. The interstitial cuts 20 are substantially 7.0 µm in lateral width. Both the tabs 18 and the cuts 20 have a constant lateral width.

In conventional thin-film device processing, a photoresist 14 structure is patterned on a suitable wafer, a 1000 Å or less insulating layer (not shown) is then vacuum deposited and the patterned photoresist 14 structure is dissolved resulting in the unwanted insulating layer deposit over the photoresist 14 being removed with it and lifted off the wafer. In this processing sequence, the same patterned photoresist 14 may often be used as an ion beam etch mask for the milling of the underlying layer. During the process of ion beam etching, the exposed photoresist 14 surface becomes hardened by the ion beam bombardment rendering the "skin" of the photoresist 14 relatively impenetrable to the dissolving solution. This undesired result occurs for both bi-layer and image reversed photoresist 14 processes and results in generally poor lift-off yields except for thicknesses of on the order of 1000 Å or less. As shown in the preceding figures, typical boundaries of a representative wide cut-to-tab design is shown and the design illustrated is the one most often utilized when castellation techniques have been used.

Figure 2A:
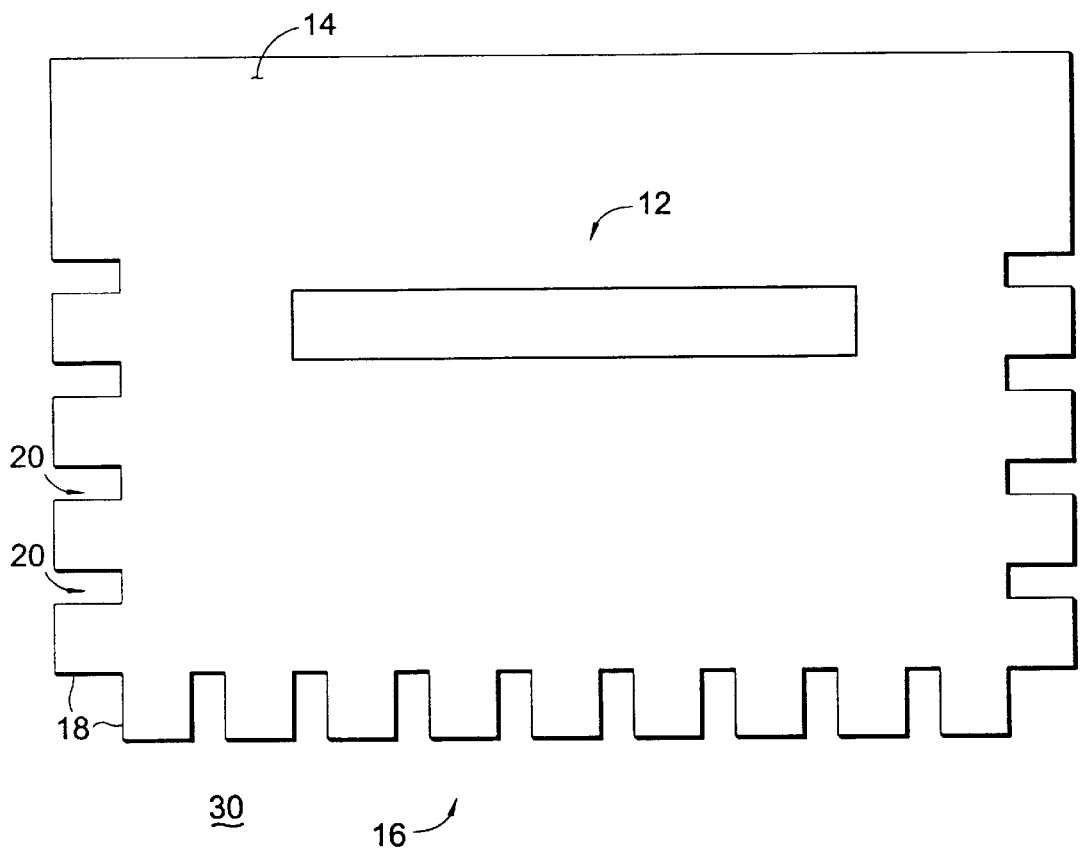
FIG. 2A illustrates a top plan view of a thin-film device structure in accordance with one embodiment of the present invention over which has been deposited a layer of photoresist having a narrow cut castellated boundary characterized by a number of peripherally extending protrusions of on the order of 7.0 $\mu$m in width and interstitial cuts of on the order of 6.0 $\mu$m in depth and 3.0 $\mu$m in width with the cut width being substantially on the order of the thickness of the photoresist layer.

With reference additionally now to FIG. 2A, a corresponding representative thin-film device structure 30 in accordance with one embodiment of the present invention is shown. The device structure 30 comprises, in the example illustrated, a similar data transducer structure 12 over which has also been patterned a layer of photoresist 14. The photoresist 14 again presents a peripheral edge portion 16 which has been patterned with a plurality of tabs 18 extending outwardly therefrom. The tabs 18 are separated by interstitial cuts (or spaces) 20 as shown.

Figure 2B:
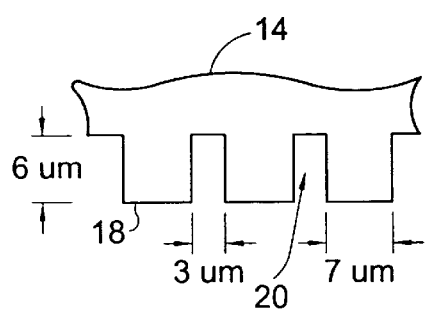
FIG. 2B is a more detailed top plan view of a portion of the narrow cut castellated boundary of FIG. 2A.

With reference additionally now to FIG. 2B, the differences in the details of the tabs 18 and cuts 20 in the narrow cut photoresist 14 of the device structure 30 is shown for sake of comparison with the wide cut structure 10 of FIGS. 1A and 1B. In this representative embodiment, the tabs have a lateral width of substantially 7.0 µm and are approximately 6.0 µm in length from their proximal to distal ends thereof. The interstitial cuts 20 are substantially 3.0 µm in lateral width and in this embodiment of the present invention, the tabs 18 and the cuts 20 also have a constant lateral width.

By correctly designing the lateral width of the tabs 18 and interstitial cuts 20 on the edge portion 16 boundary of the photoresist 14 structure, it is possible to create regions of the photoresist 14 edge portion 16 which have experienced relatively low levels of ion beam exposure during the ion milling operation in addition to low deposit penetration in selected corners. These regions then enable facilitated penetration of the photoresist dissolving solution resulting in improved lift-off for thicker deposits which have been heretofore achievable. The narrow cut photoresist 14 structure of FIGS. 2A and 2B exhibits superior lift-off capability to the wide cut structure 10 of FIGS. 1A and 1B to enable thicker insulation layer lift-off of on the order of 4000 Å to 5000 Å.

Figure 3A:
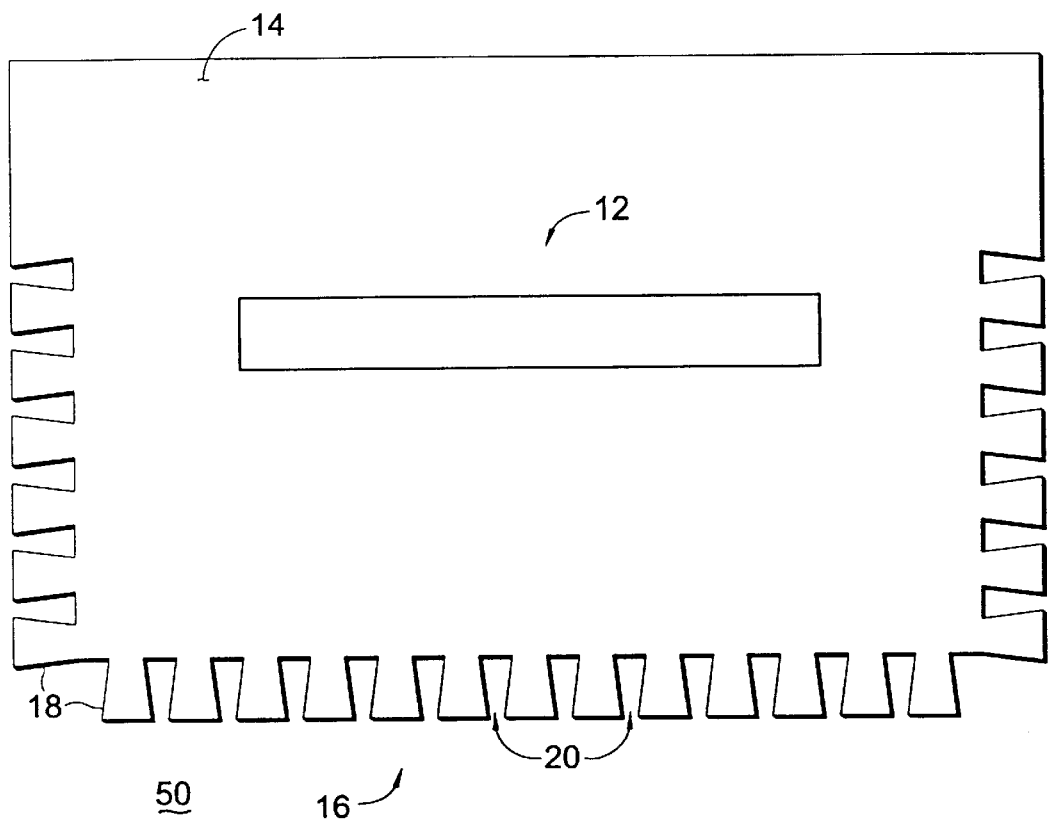
FIG. 3A illustrates a top plan view of the same thin-film device structure in accordance with another embodiment of the present invention over which has been deposited a layer of photoresist having an additional exemplary variation of the narrow cut castellated boundary of FIGS. 2A and 2B wherein a number of peripherally extending protrusions of on the order of 6.0 $\mu$m in width at their distal ends and interstitial cuts of on the order of 6.0 $\mu$m in depth are shown with the width of the cuts varying between approximately 4.0–2.0 $\mu$m in width, with the back end of the cut being made wider than that of the front end and with the mean value of the cut width being substantially on the order of that of the photoresist thickness.

With reference additionally now to FIG. 3A, a corresponding representative thin-film device structure 50 in accordance with another embodiment of the present invention is shown. The device structure 50 similarly comprises, in the example illustrated, a data transducer structure 12 over which has again been patterned a relatively thick layer of photoresist 14. The photoresist 14 similarly presents a peripheral edge portion 16 which has been patterned with a plurality of tabs 18 extending outwardly therefrom. The tabs 18 are separated by interstitial cuts (or spaces) 20 as shown.

Figure 3B:
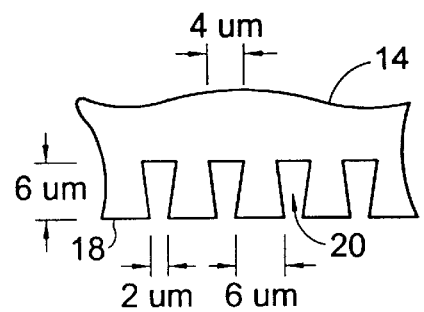
FIG. 3B is a more detailed top plan view of a portion of the variation of the narrow cut castellated boundary of FIG. 3A.

With reference additionally now to FIG. 3B, the differences in the details of the tabs 18 and cuts 20 in this alternative narrow cut photoresist 14 design of the device structure 50 is shown for sake of comparison with the narrow cut structure of FIGS. 2A and 2B. In this alternative embodiment, the tabs have a lateral width at their distal ends of substantially 6.0 µm which tapers down to substantially 4.0 µm at their proximal ends while remaining approximately 6.0 µm in length. The interstitial cuts 20 are substantially 2.0 µm in lateral width adjoining the distal ends of the tabs 18 and taper outwardly to approximately 4.0 µm adjacent the proximal ends of the tabs 18.

With respect to this alternative embodiment of the present invention structure 50, it can be seen that an enhancement to the narrow cut structure of FIGS. 2A and 2B is achieved by the merging of the inner corners of adjacent tabs 18 creating a larger region for solution penetration than would otherwise be possible. The "narrow cut" design further prevents the thicker deposit from filling this region because of the increased shadowing of a smaller aperture between the distal portions of the tabs 18 and cuts 20. Also, together with thick depositions, longer deposition times are required thereby producing higher substrate temperatures that, in turn, increases the thermal stress on the photoresist 14. This stress has been shown to result in the relatively narrow tabs (shown in FIGS. 1A and 1B) lifting up and making this wide cut design for the most part ineffective.

Proper design in castellation as proposed above with respect to the embodiments of FIGS. 2A, 2B, 3A and 3B enables the use of increased ion beam etching times (prior to deposition) for thicker magnetoresistive and permanent magnet stacks as are utilized primarily in tape heads. The "narrow cut" design disclosed above allows for the use of extra thick insulation layers in the range of 4000 Å or more. This thicker deposit better covers residual debris from the ion beam etching operation and allows for a wider range of planarization. Such an extra thick insulator deposit provides for higher electrical isolation that otherwise would not be achievable in multi-channel heads. This increased insulator thickness and improved planarization capability aids in increasing overall device yield and in reducing cost with minimal modifications to existing processes and a castellation design change.

While there have been described above the principles of the present invention in conjunction with specific thin-film device structures and castellation dimensions, it is to be clearly understood that the foregoing description is made only by way of example and not as a limitation to the scope of the invention. Particularly, it is recognized that the teachings of the foregoing disclosure will suggest other modifications to those persons skilled in the relevant art.

Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A photoresist lift-off structure for forming a thin-film device comprising:
    a photoresist layer overlying a thin-film device structure formed on a substrate,
    said photoresist layer including a plurality of peripherally extending tabs having interstitial spaces there between, at least one of said plurality of tabs having a lateral width greater than a corresponding lateral width of adjacent ones of said interstitial spaces,
    wherein the plurality of peripherally extending tabs are formed along a peripheral edge portion of said photoresist layer.

2. The photoresist lift-off structure of claim 1 wherein at least one of said interstitial spaces includes distal and proximal portions thereof with said distal portions being smaller in lateral width than said proximal portions.

3. The photoresist lift-off structure of claim 2 wherein said at least one of said interstitial spaces tapers substantially linearly from said lateral width at said distal portion to said lateral width at said proximal portion.

4. The photoresist lift-off structure of claim 1 wherein said at least one of said plurality of tabs is substantially 7.0 µm in lateral width.

5. The photoresist lift-off structure of claim 1 wherein said adjacent ones of said interstitial spaces is substantially 3.0 µm in lateral width.

6. The photoresist lift-off structure of claim 1 wherein said adjacent ones of said interstitial spaces are substantially 6 µm in depth.

7. The photoresist lift-off structure of claim 2 wherein said at least one of said plurality of tabs is substantially 6.0 µm in lateral width at said distal portion thereof.

8. The photoresist lift-off structure of claim 2 wherein at least one of said interstitial spaces is substantially 4.0 µm in lateral width at said proximal portion thereof.

9. The photoresist lift-off structure of claim 2 wherein adjacent ones of said interstitial spaces is substantially 2.0 µm in lateral width at said distal portion of said at least one of said plurality of tabs.

10. The photoresist lift-off structure of claim 2 wherein said adjacent ones of said interstitial spaces are substantially 6.0 µm in depth.

11. The photoresist lift-off structure of claim 1 wherein said lateral width of said adjacent ones of said interstitial spaces is substantially equal to said photoresist layer thickness.

12. The photoresist lift-off structure of claim 1, further comprising:
    an insulating layer deposited on said photoresist layer.

13. The photoresist lift-off structure of claim 12, wherein said insulating layer is removed by lifting off said photoresist layer.

14. The photoresist lift-off structure of claim 13, wherein said insulating layer has a thickness of 4000 Angstroms or greater.

15. A photoresist lift-off structure for forming a thin-film device comprising:
    a thin-film device structure formed on a substrate;
    a photoresist layer overlying said thin-film device structure, said photoresist layer having a peripheral edge portion with a plurality of peripherally extending tabs, said peripherally extending tabs having interstitial spaces there between, wherein at least one of said plurality of tabs has a lateral width greater than a corresponding lateral width of an adjacent one of said interstitial spaces.

16. The photoresist lift-off structure of claim 15 wherein at least one of said interstitial spaces includes distal and proximal portions thereof with said distal portions being smaller in lateral width than said proximal portions, wherein said distal portions of said interstitial spaces correspond to distal portions of said peripheral edge portion of said photoresist layer.

17. The photoresist lift-off structure of claim 16 wherein said at least one of said interstitial spaces tapers substantially linearly from said lateral width at said distal portion to said lateral width at said proximal portion.

18. The photoresist lift-off structure of claim 16, further comprising:
    an insulating layer deposited on said photoresist layer.

19. The photoresist lift-off structure of claim 18, wherein said insulating layer is removed by lifting off said photoresist layer.

20. The photoresist lift-off structure of claim 19, wherein said insulating layer has a thickness of 4000 Angstroms or greater.

21. A method of using a photoresist lift-off structure for forming a thin-film device, comprising:
    forming a photoresist layer over a thin-film device structure formed on a substrate, said photoresist layer having a peripheral edge portion with a plurality of peripherally extending tabs, said peripherally extending tabs having interstitial spaces there between, wherein at least one of said plurality of tabs has a lateral width greater than a corresponding lateral width of an adjacent one of said interstitial spaces;
    depositing an insulating layer on said photoresist layer; and
    lifting off said photoresist layer to remove said insulating layer and said photoresist layer.

22. The method of claim 21 wherein at least one of said interstitial spaces includes distal and proximal portions thereof with said distal portions being smaller in lateral width than said proximal portions, wherein said distal portions of said interstitial spaces correspond to distal portions of said peripheral edge portion of said photoresist layer.

23. The method of claim 22 wherein said at least one of said interstitial spaces tapers substantially linearly from said lateral width at said distal portion to said lateral width at said proximal portion.

24. The method of claim 21, wherein said insulating layer has a thickness of 4000 Angstroms or greater.

* * * * *